Jan. 13, 1970     A. W. SPARROW     3,489,254
TORQUE CONVERTER CLUTCH WITH CENTRIFUGAL VALVE
Filed Jan. 31, 1968                                       4 Sheets-Sheet 1

Inventor
ALAN W. SPARROW
BY Tweedale & Gerhardt
Attorneys

Inventor
ALAN W. SPARROW
BY
Tweedale & Gerhardt
Attorneys

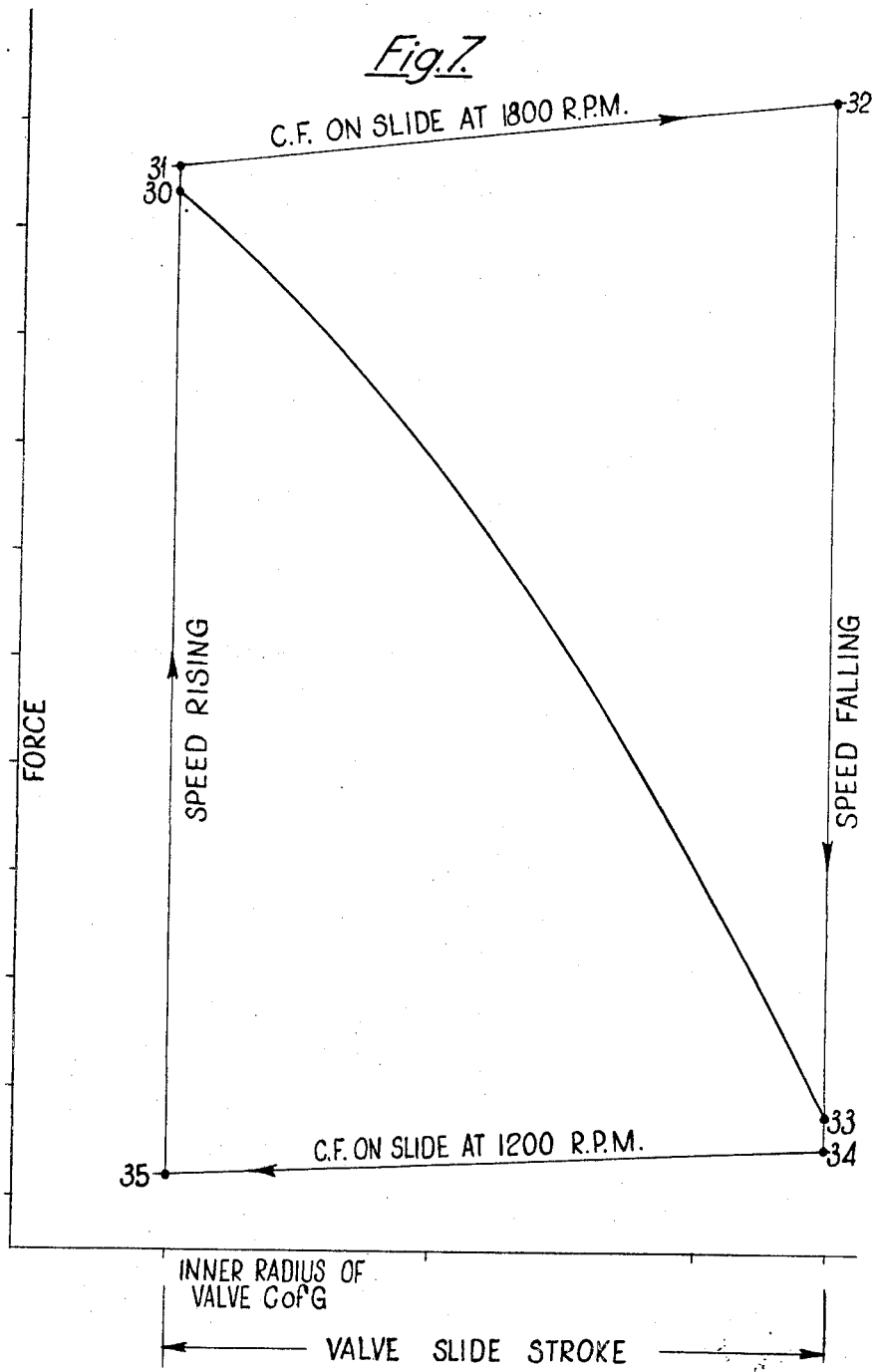

United States Patent Office 3,489,254
Patented Jan. 13, 1970

3,489,254
TORQUE CONVERTER CLUTCH WITH
CENTRIFUGAL VALVE
Alan W. Sparrow, Peterborough, England, assignor to Perkins Engines Limited, Peterborough, England, a joint-stock company of England
Filed Jan. 31, 1968, Ser. No. 702,129
Claims priority, application Great Britain, Feb. 17, 1967, 7,579/67
Int. Cl. F16d 37/00, 23/10, 43/06
U.S. Cl. 192—3.29
4 Claims

ABSTRACT OF THE DISCLOSURE

A torque converter clutch is controlled by a valve mounted on the periphery of the pump housing. The valve housing has a radial bore which slideably receives a valve member which is biased to the inner clutch disengaged position by opposed spring means which are so located that the spring force diminishes as the valve member moves outwardly to a clutch engaged position. At a first rotational speed, centrifugal force overcomes the inward spring bias and moves the valve member to the outward position against the diminishing bias. At a second lower rotational speed, the spring force overcomes centrifugal force to move the valve member positively to the inward position with an increasing bias. The spring means alternatively comprise spring levers interconnecting the valve member and body or rigid levers bearing on spring members carried by the valve member or body.

---

Figure 1:
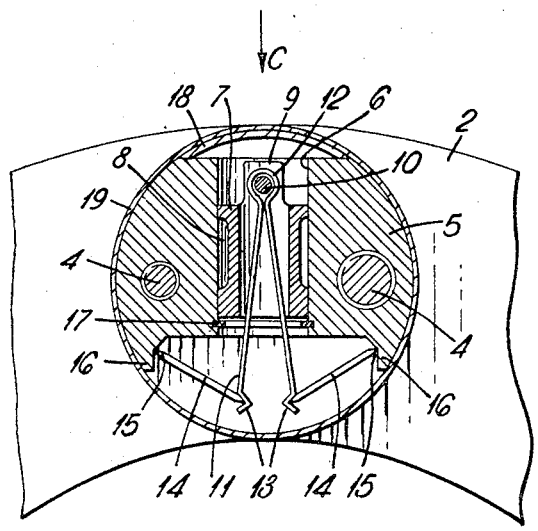

This invention relates to an automatic hydraulic control valve. The invention is especially, but not exclusively applicable to an automatic hydraulic control valve for controlling the operation of a lockup clutch in a hydrokinetic torque converter.

Previously proposed automatic hydraulic control valves suffer from the disadvantage that when the value of a variable force tending to actuate the valve lies in a critical range containing a predetermined value at which the valve is required to switch from one state to another an unstable condition known as "hunting" may occur. Other previously proposed automatic hydraulic control valves suffer from the disadvantage that the value of the force required to actuate the valve does not remain substantially constant over a period of use (for example, one year) as a result of part of the valve mechanism wearing.

An object of the present invention is to provide an improved automatic hydraulic control valve in which the above mentioned disadvantages are obviated or mitigated.

According to the present invention, there is provided an automatic hydraulic control valve including a valve body having a valve chamber therein, a valve member in the valve chamber and movable therein between first and second positions so as to define two different states of the valve respectively, and a spring arranged so that a component of the spring force always urges the valve member towards the first position and the value of said component varies with movement of the valve member and is greatest when the valve member is at the first position and reduces as the valve member moves to the second position, whereby the valve may switch at respectively different values of a valve actuating force acting on the valve member in opposition to the said component of the spring force.

Further, according to the present invention, there is provided an automatic hydraulic control valve including a valve body having a valve chamber therein, pressure fluid connections in the valve body and in communication with the valve chamber, a valve member in the valve chamber and movable between first and second positions in at least one of which the valve member blocks one of said connections, and spring means constantly urging the valve member towards one of said positons against forces urging the valve member towards the other position, the spring means being arranged to have a negative rate effect on the valve member.

The term "negative rate effect" is used herein and in the appended claims to define the condition when the tangent to the load (ordinate)/deflection (abscissa) curve of the valve member is downwardly sloping towards the right whether the force acting on the valve member is a torque or a linear force.

Still further, according to the present invention, there is provided in a hydrokinetic torque converter having a pump element, a turbine element, and a clutch hydraulically operable so as to clutch the pump element to the turbine element; an automatic hydraulic control valve as aforesaid for controlling the operation of the said clutch, said control valve being mounted on the pump element and adapted to permit hydraulically actuated engagement of the clutch when the valve member is in the said second position and to release the clutch when the valve member is in the said first position, said valve operating force being centrifugal force acting on the valve member during rotation of the said pump element.

Figure 3:
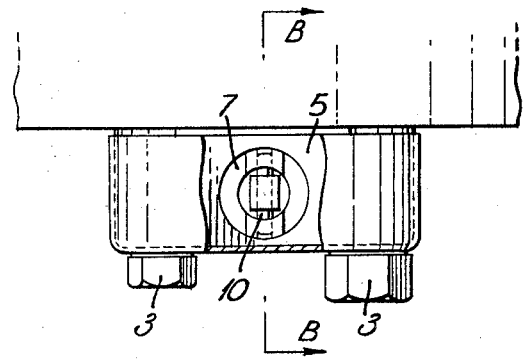
Figure 2:
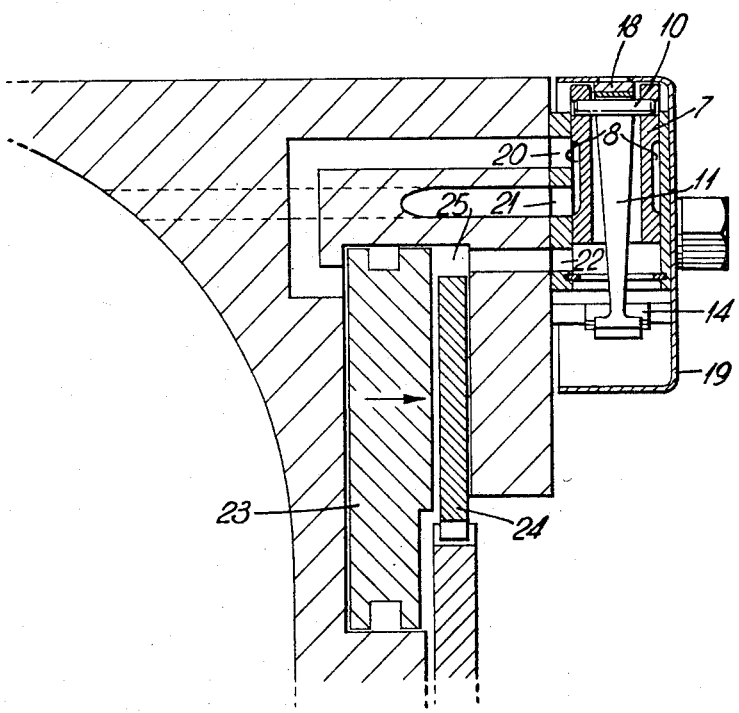

Embodiments of the invention will now be described by way of example, with reference to the drawings in which:

FIG. 1 is a sectional elevation of a first embodiment of an automatic hydraulic control valve according to the present invention, FIG. 2 shows a cross section of the valve of FIG. 1 on the line B—B in FIG. 3, and also shows part of a hydrokinetic torque converter having a lock-up clutch, FIG. 3 is a partly sectioned view on arrow C in FIG. 1, FIGS. 4, 5 and 6 are sectional elevations similar to that of FIG. 1 of second, third and fourth embodiments of an automatic hydraulic control valve according to the present invention, and FIG. 7 is a load/deflection diagram defining the characteristics of force acting on the valve member of an automatic hydraulic control valve according to the present invention.

In FIGURES 1, 2 and 3 an automatic hydraulic control valve, indicated generally by numeral 1 is fixed to a point on the periphery of a torque converter pump 2 by two set bolts 3 of different sizes passing through respective holes 4 so that the possibility of incorrect assembly is reduced.

The valve 1 consists of a valve body 5 having a valve chamber in the form of bore 6 therethrough and extending radially of the torque converter turbine axis. A valve member or slider 7 having a waisted portion 8 intermediate its ends is movable along the bore 6 and at its radially outer end has a pair of upstanding lugs 9 cross-connected by a pin 10. The slider 7 is hollow and a hairpin spring 11 is clipped at its loop end 12 to the pin 10 and extends radially inwardly and out of the bore 6. The free ends 13 of the spring 11 are notched and struts 14 having knife-edge ends 15 are each propped against shoulders 16 on the valve body 5 and are each held in the propped position by engagement of the opposite knife-edges with the notches in the outwardly biasing spring ends 13. The radially inward limit of travel of the slider 7 is defined by a spring clip 17 lodged in a recess in the bore 6. The outer limit is defined by a domed washer 18 held in place over the outer end of the bore 6 by a cup-like cover 19.

In FIGURE 2 a radially outer port 20 in the valve body 5 is in communication with one side of a clutch actuator piston 23 which may move under hydraulic pressure so as to engage a clutch plate 24 of a lock-up clutch for the torque converter. A middle port 21 is connected to a source of pressure fluid, in this case the interior of the torque converter itself. A radially inner port 22 is in communication with the other side of the clutch actuator piston 23 in a manner such that a pressure rise in the fluid which may pass through the port 22, however caused, tends to disengage the clutch. It will be understood that the clutch, when engaged, bridges the pump and turbine of the converter so that no torque conversion may take place. In FIGURE 2 the clutch plate 24 is drivingly connected to the torque converter turbine which is not shown.

If a spring is used to disengage the clutch, the inner port 22 may be dispensed with, and, alternatively, if the control valve is used in an installation where the clutch is engaged by spring action and disengaged by fluid pressure, the outer port 20 may be dispensed with.

In the inner radial position of the slider 7, the port 20 is open and the clutch actuator 23 is vented, the clutch being disengaged positively by blocking flow through port 22 and creating a centrifugal head in region 25 (FIG. 2). In the outer position of the slider 7 the outer port 20 is connected to the middle port 21 by way of the waisted portion 8 on the slider 7 thus permitting actuation and engagement of the clutch and venting of the previously blocked inner port 22.

The form of the spring and the linkage effect produced by the disposition of the struts 14 combine to impose a "negative rate effect" on the slider 7. At the position shown in FIGURE 1 the radially inward component of the force of spring 11 on the slider 7 is at its maximum and at progressively increasing positions radially outwardly of this the value of this component diminishes.

The operation of the automatic control valve will now be described with reference to the graph shown in FIGURE 7.

As the speed of the pump increases so does the centrifugal force acting on the slider and tends to displace it radially. The slider will not be displaced radially however until such time as the centrifugal force reaches a value slightly in excess of the sum of the spring bias and frictional force on the slider 7 at its inner position. When this happens the slider 7 will immediately "flip" to the radially outer position. At the radially outer position the struts 14 have not reached their toggling position, i.e. the position in which they are pointing at each other, and so the spring bias, though much lower, is still in the direction to return the slider to the inner position. Point 30 on the graph shows the level of force needed to overcome the spring bias at the inner position, and point 31 represents the centrifugal force required to overcome spring bias and static friction. This occurs at about 1800 r.p.m.

As the slider moves outwards the centrifugal force on it increases slightly due to the increased distance of its center of gravity from the center of rotation. This increase is represented by the slight inclination of the line joining points 31 and 32.

As stated before, movement of the slider to the outer position locks the clutch and any increase in speed of the torque converter maintains the valve in the outer position.

When the speed falls the speed has a drop to a comparatively low value when the centrifugal force acting on the slider reaches a value slightly lower than the spring bias on the slider in the outer position. The speed has to fall by a further slightly smaller amount to enable the spring bias to overcome the small additional effect of static friction. Thus the centrifugal force drop is represented by the distance between points 32 and 33 and the static friction force by the distance between points 33 and 34.

As the speed drops through say 1200 r.p.m. the slider will "flip" to the inner position represented by point 35 on the graph, the clutch will disengage and the torque converter will begin to convert again.

It will be appreciated that the presence of a large static frictional component in a mechanism of this kind especially where wear is likely to cause uncertain fluctuations, is unsatisfactory. The present mechanism exerts a minimum of frictional force on the slider due to the knife edges 15 and to the lack of any sideways force on the slider which would cause rubbing in the bore 6. Further the onset of wear would have very little effect on the performance of the mechanism.

The valve is adjusted initially insofar as point 31 is concerned by selective assembly of parts. Insofar as point 34 is concerned it is merely necessary to selectively insert washers 18 of appropriate curvature. None of the parts of the mechanism are subject to high loads and in installations where a lock-up clutch is provided for a torque converter the number of times the clutch will lock and unlock in the course of its operation is very small in comparison with the number of reversals required to affect the resilience of the spring 11.

Figure 4:
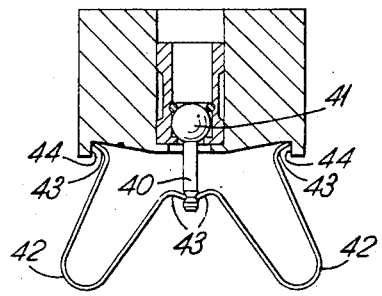

FIGURE 4 shows a second embodiment of the invention in which a short shaft 40 having a ball end 41 loosely secured in the end of the slider biases the latter under the action of two U-springs 42. The knife-edge ends 43 of both springs locate in a notch at the end of shaft 40 and against the shoulders 44 on the valve body. This arrangement gives a similar "negative rate" characteristic as that shown in FIG. 7.

Figure 5:
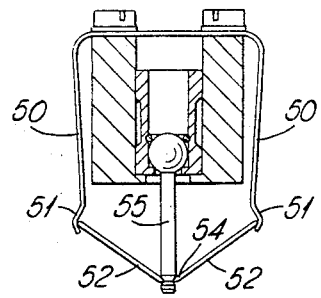

In FIG. 5 a pair of cantilevered leaf springs 50 extend alongside the valve body and have notches 51 at their free ends. Knife-edge-ended struts 52 similar to those of FIGURES 1 to 3 are propped between the notches 51 and a notch 54 at the free end of shaft 55, which is held in the slider in a similar manner to that shown in FIG. 4.

Figure 6:
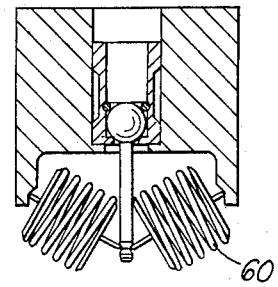

In FIG. 6 the U-springs of FIG. 4 are replaced by coil springs 60, the arrangement being otherwise the same.

The characteristics shown in FIG. 7 are given by the spring and linkage arrangements shown in FIGS. 5 and 6.

While the specific embodiments described have all been linear movement valves suitable for a torque converter application it will be apparent that a rotary type valve having similar characteristics could now be made as a result of studying the above teaching.

I claim:

1. A hydraulic control valve adapted to control engagement of a torque converter clutch in response to centrifugal force resulting from the speed of a torque converter pump, comprising: a valve housing fixed to the periphery of the pump and having a bore extending radially of the pump axis, a plurality of hydraulic fluid ports opening into the bore radially thereof, a valve member slidable in the bore between a first radially outward position bridging a combination of ports to actuate the clutch and a second radially inward position bridging another combination of ports to disengage the clutch, a pair of opposed spring means interconnecting the valve member with a radially inward portion of the valve housing and biasing the valve to its second position, the spring means being so positioned that their effective lines of force acting on the valve member decrease in acuteness to the valve member axis upon movement thereof from its second to first position to decrease the inward biasing force on the valve member as the valve member moves from its first to second position, the valve member being responsive to centrifugal force at a first pump rotational speed to move against the biasing force to its first position to engage the clutch and the spring means thereafter being responsive to a lower second rotational speed to overcome the reduced centrifugal force and move the valve member to its second position.

2. A control valve according to claim 1 wherein the spring means each constitute a resilient lever one end of which is connected to the valve member for movement therewith and the other end of which bears on the valve housing.

3. A control valve according to claim 1 wherein the spring means each include a spring carried by the valve member for movement therewith and a lever one end of which bears on the spring and the other end of which bears on the valve housing.

4. A control valve according to claim 1 wherein the spring means each include a spring mounted on the valve housing, and a lever one end of which bears on the spring and the other end of which bears on the valve member.

References Cited
UNITED STATES PATENTS

| | | | |
|---|---|---|---|
| 1,090,893 | 3/1914 | Ness | 137—531 |
| 2,598,439 | 5/1952 | Reger | 137—56 |
| 2,654,564 | 10/1953 | Pech | 251—75 X |
| 2,712,427 | 7/1955 | Welborn et al. | 251—75 X |
| 2,860,660 | 11/1958 | Swatsworth | 251—75 X |
| 2,894,609 | 7/1959 | Tattersall | 192—3.3 |
| 2,967,022 | 1/1961 | Wood et al. | 251—243 X |
| 3,064,669 | 11/1962 | Sheppard | 137—56 X |
| 3,262,523 | 7/1966 | Gordon | 192—3.29 |
| 3,264,884 | 9/1966 | Brooker | 251—75 X |
| 3,390,594 | 7/1968 | Gillespie | 192—3.31 X |
| 3,390,831 | 7/1968 | Eaton | 251—75 X |

BENJAMIN W. WYCHE III, Primary Examiner

U.S. Cl. X.R.

137—57; 192—103; 251—75